(12) United States Patent
　Szafran et al.

(10) Patent No.: US 12,630,142 B2
(45) Date of Patent: May 19, 2026

(54) SINGLE-ENGINE HOVERCRAFT CONTROL SYSTEM AND METHOD

(71) Applicant: Lukasiewicz Research Network - Institute of Aviation, Warsaw (PL)

(72) Inventors: Krzysztof Szafran, Nadarzyn (PL); Wieslaw Zalewski, Bialobrzegi (PL); Marcin Janiszewski, Pruszków (PL); Konrad Kozaczuk, Siemień (PL)

(73) Assignee: Lukasiewicz Research Network—Institute of Aviation, Warsaw (PL)

( * ) Notice: Subject to any disclaimer, the term of this patent is extended or adjusted under 35 U.S.C. 154(b) by 426 days.

(21) Appl. No.: 18/317,557

(22) Filed: May 15, 2023

(65) Prior Publication Data

US 2023/0365114 A1　Nov. 16, 2023

(51) Int. Cl.
B60V 1/14 (2006.01)
B60V 1/11 (2006.01)
B60V 1/15 (2006.01)
B64C 9/12 (2006.01)
B64C 11/00 (2006.01)

(52) U.S. Cl.
CPC ................ B60V 1/145 (2013.01); B60V 1/11 (2013.01); B60V 1/14 (2013.01); B60V 1/15 (2013.01); B64C 9/12 (2013.01); B64C 11/001 (2013.01); *B60V 1/115* (2013.01)

(58) Field of Classification Search
CPC .. B60V 1/145; B60V 1/11; B60V 1/14; B60V 1/115; B60V 1/15; B64C 9/12; B64C 11/001
See application file for complete search history.

(56) References Cited

U.S. PATENT DOCUMENTS

| | | | | |
|---|---|---|---|---|
| 3,259,097 | A | * | 7/1966 | Van Veldhuizen ....... B63H 7/00 440/43 |
| 3,398,809 | A | * | 8/1968 | Wood ..................... B60V 1/043 180/21 |
| 3,468,394 | A | * | 9/1969 | Winter ..................... B60V 1/14 180/117 |
| 3,797,400 | A | * | 3/1974 | Van Veldhuizen ...... B61B 13/08 104/23.2 |
| 3,799,446 | A | * | 3/1974 | Rado ........................ B60V 1/14 180/117 |
| 3,870,121 | A | * | 3/1975 | Schneider .............. B60V 1/043 180/117 |
| 4,056,159 | A | * | 11/1977 | Evans .................... B60V 3/065 180/126 |
| 4,111,277 | A | * | 9/1978 | Peissel ................... B60V 1/043 180/122 |

(Continued)

FOREIGN PATENT DOCUMENTS

PL　　　　430204 A1　12/2020

*Primary Examiner* — Timothy Wilhelm
(74) *Attorney, Agent, or Firm* — Young Basile Hanlon & MacFarlane, P.C.

(57) ABSTRACT

A control system of a hovercraft that includes one engine and one propulsion fan enclosed in a duct in which swivel side flaps are located is described. The control system includes, downstream of the duct, at least three rudders. Each of the rudders operates in the full range of angular position, regardless of the position of the swivel side flaps. A control method of such a hovercraft is also described.

6 Claims, 3 Drawing Sheets

(56)          References Cited

U.S. PATENT DOCUMENTS

| | | | | |
|---|---|---|---|---|
| 4,397,367 | A * | 8/1983 | Ivanov | B60V 1/14<br>180/117 |
| 5,005,660 | A * | 4/1991 | Yoshida | B60V 1/14<br>180/117 |
| 5,096,012 | A * | 3/1992 | Chia | B60V 1/14<br>180/117 |
| 5,097,919 | A * | 3/1992 | Cox | B60V 1/14<br>440/37 |
| 5,158,033 | A * | 10/1992 | Evans | B60V 1/14<br>180/126 |
| 7,101,235 | B2 * | 9/2006 | Baldwin | B63H 7/02<br>440/37 |
| 7,383,907 | B2 * | 6/2008 | Talanov | B60V 1/14<br>180/117 |
| 10,160,435 | B2 * | 12/2018 | Feng | B60V 1/14 |
| 2017/0297550 | A1 | 10/2017 | Feng et al. | |

* cited by examiner

SINGLE-ENGINE HOVERCRAFT CONTROL SYSTEM AND METHOD

CROSS-REFERENCE TO RELATED APPLICATION

This application claims priority to Polish Patent Application No. P.441167, filed May 13, 2022, which is incorporated herein in its entirety by reference.

TECHNICAL FIELD

The invention relates to a system and a method for independent control of the propulsion thrust and the mass air flow through the air-cushion of a hovercraft equipped with a single propulsion engine.

BACKGROUND

Hovercrafts are vehicles that move on an air-cushion above the surface of water or land. Hovercrafts are used, for example, for rescue or patrolling in areas of frozen rivers and lakes, low inland waters, and swampy areas.

In single-engine hovercrafts, the propulsion fan rotates inside the duct mounted in the hull of the hovercraft and the pocket distributes the airflow into the thrust generating forward motion and the airflow into the hovercraft's apron, generating the air-cushion. Importantly, depending on the terrain and weather conditions, the required value and ratio of propulsion system power split between progressive thrust generating power and air-cushion vary. From a flight safety point of view, cases such as flying on water or ice with the wind or flying down a fast-moving river are very relevant. For such flight conditions, the pilot must maintain sufficiently high pressure in the air-cushion, while the thrust generating the forward progressive motion should be at a low level so that the hovercraft does not accelerate to dangerous speeds. It is also very important to maintain directional control capability in such a flight condition.

A possible solution is to regulate the distribution of power between the power generating the progressive thrust and the power generating the air-cushion by using two motors and two propulsion fans. This solution adds to the complexity of the propulsion system, increasing the production costs of the hovercraft. The use of a separate fan to pump the air-cushion significantly increases the noise generated due to the high speed of such fans.

Polish Patent Application No. P.430204 describes a system of steering a hovercraft comprising at least one fan, at least one directional rudder, a steering member coupled to the directional rudder, and at least two lateral reversing elements independently biasably movable relative to each other, having a resting position in which they do not hinder the airflow, and at least one operating position in which they deflect part of the airflow. Each reversing element is coupled to the directional rudder by means of at least one power assisted unit, where the power assisted unit is configured to move the reversing element between its operating and resting positions depending on the value of the directional rudder angle.

SUMMARY

The solution described in Polish Patent Application No. P.430204 shows that the use of only two directional rudders results in insufficient directional control during forward flight. The activation of the thrust reverser require the two rudders to be set in a V-shape and make it impossible to correct the direction of flight during a braking maneuver, which is particularly important for flight safety.

An object of this disclosure is to provide a solution for a propulsion system and control system of a hovercraft that is equipped with a single propulsion motor. The thrust generated by the propulsion fan is allowed to be reduced to generate progressive movement, while maintaining a constant mass flow of air through the air-cushion and providing full directional control capability.

A hovercraft control system described herein includes one motor and one propulsion fan enclosed by a duct in which swivel side flaps are located. At least three directional rudders are located downstream the duct, wherein each of the directional rudders is operating in the full range of angular positions independently of the position of the swivel side flaps. Stated differently, regardless of the angle (e.g., the position) of the swivel side flaps, the directional rudders can operate at all angular positions that are available based on their operating characteristics. The full range of angular positions in the examples herein includes 360 degrees.

Advantageously, the swivel side flaps rotate symmetrically relative to the longitudinal axis of the hovercraft.

Advantageously, in the duct downstream the propulsion fan and parallel to the ground, there is at least one bottom plate forming a pocket that redirects part of the airflow passing the hovercraft to the apron and at least one top plate. The plates are the mountings for the rotational axis of the directional rudders, the swivel side flaps, and horizontal rudders.

A control method of a hovercraft that includes one motor and one propulsion fan enclosed by a duct in which swivel side flaps are located is described. According to the control method, the thrust generating the progressive movement of the hovercraft is controlled by varying the angle of tilt of the swivel side flaps, and the direction of flight of the hovercraft is controlled independently by varying the angle of tilt of at least three directional rudders. The directional rudders operate in the full range of angular position independently of the position of the swivel side flaps.

Advantageously, in the control method of the hovercraft according to some embodiments of the invention, the swivel side flaps rotate symmetrically with respect to the longitudinal axis of the hovercraft.

Advantageously, in the control method the hovercraft according to some embodiments the invention, all directional rudders angle is the same. Stated differently, respective angles of all directional rudders are equal.

These embodiments, and variations in these embodiments, are described hereinafter.

BRIEF DESCRIPTION OF THE DRAWINGS

The present invention is explained in the embodiment illustrated in the drawing figures in which the same reference numbers refer to the same elements unless otherwise indicated.

FIG. 3 shows a diagram of the propulsion system of a hovercraft with swivel side flaps in the operating position in section through a horizontal plane through the axis of rotation of the propulsion fan in a top view.

DETAILED DESCRIPTION

Figure 1:
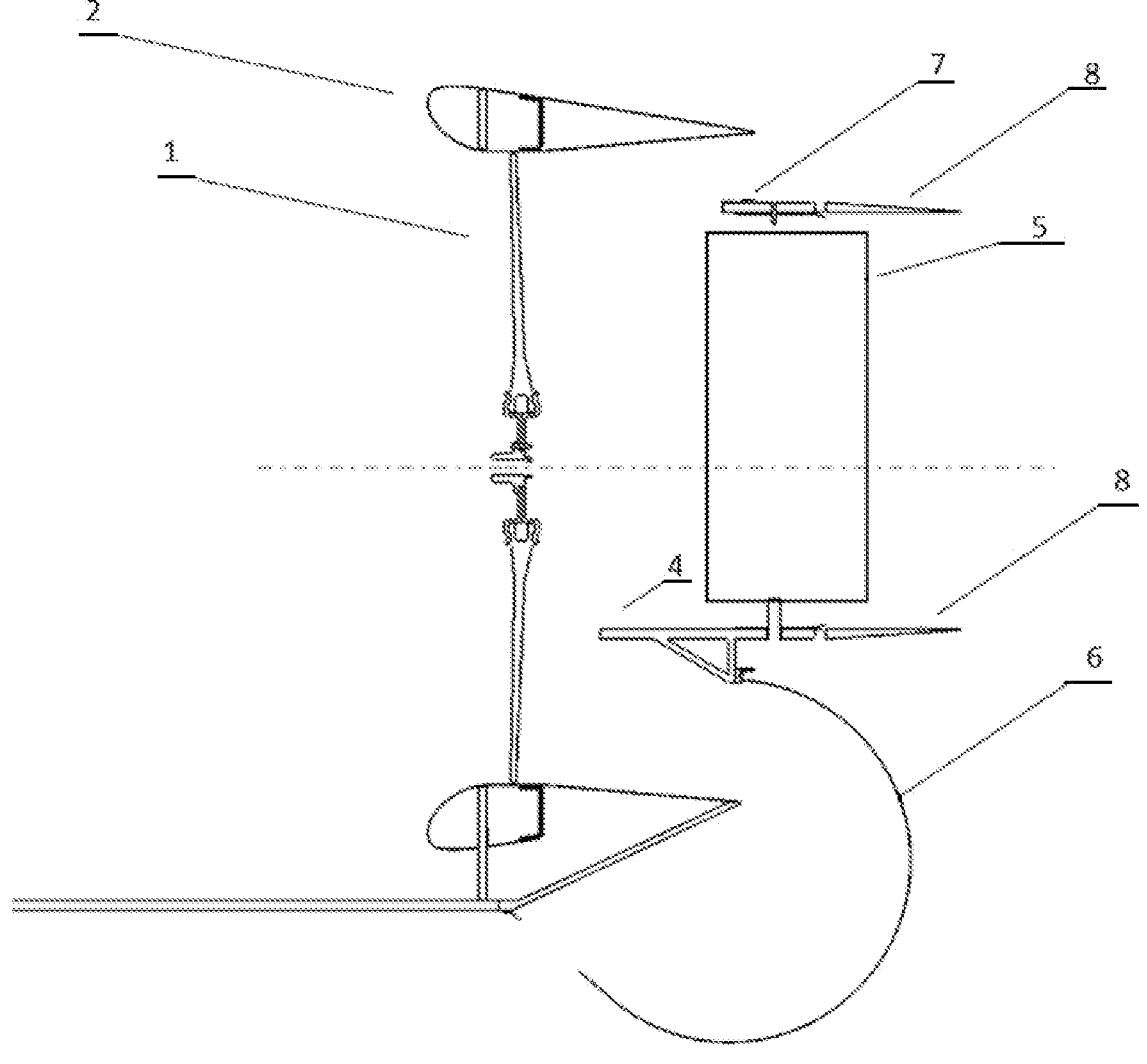
FIG. 1 shows a diagram of the hovercraft control system in section through its plane of symmetry in a side view.
Figure 2:
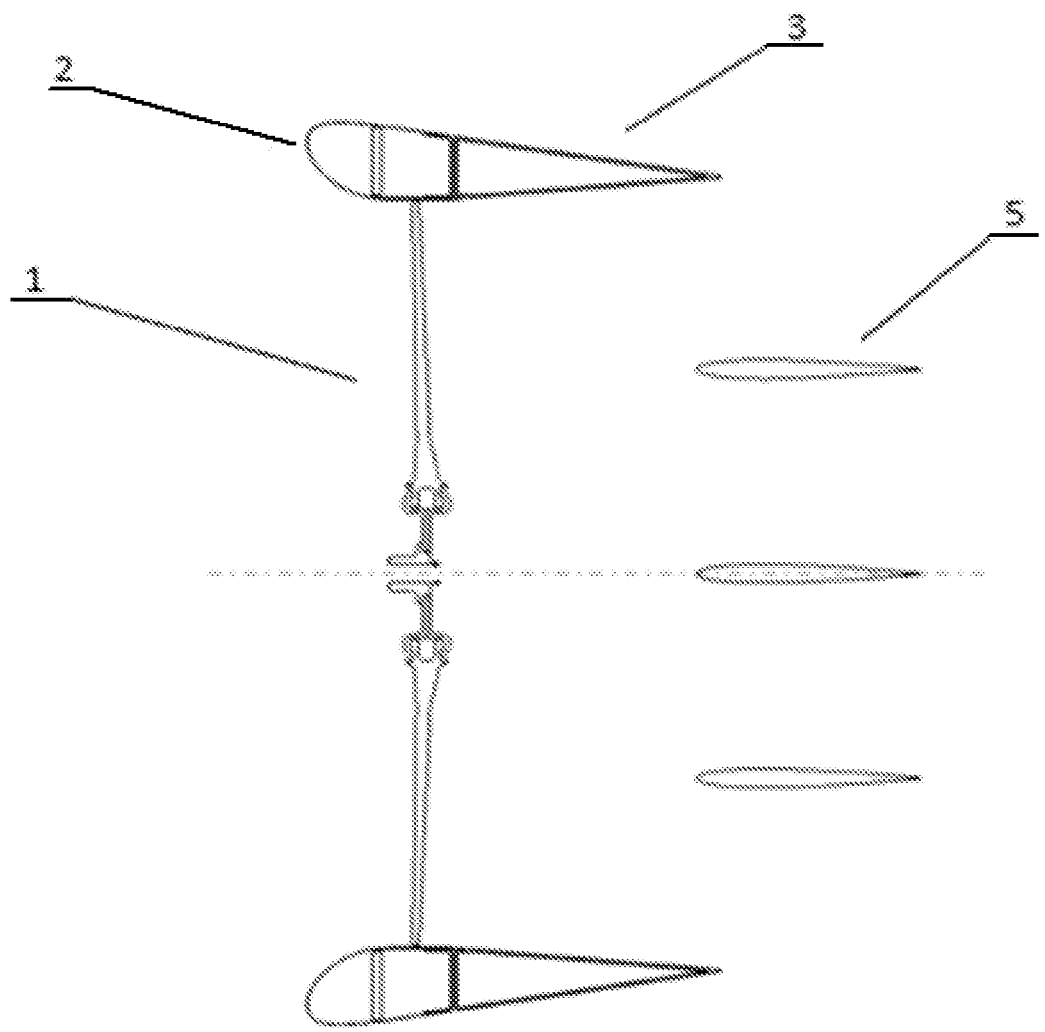
FIG. 2 shows a diagram of the hovercraft control system in section through the horizontal plane through the axis of rotation of the propulsion fan in a top view.

In an embodiment illustrated in FIGS. 1 and 2, a hovercraft control system and method includes a motor and one propulsion fan 1 enclosed by a duct 2. In the duct 2 downstream the propulsion fan 1 and parallel to the ground there is a bottom plate 4 forming a pocket redirecting the airflow passing to the part generating the propulsion thrust and the part to the apron forming an air-cushion 6. The duct 2 is equipped on both sides with swivel side flaps 3, which in the resting position form the inner surface of the duct 2 and do not hinder the airflow. Downstream the swivel side flaps 3, at least three aerodynamic directional rudders 5 are mounted in the stream downstream the fan and operate in a full range of angular positions independently of the swivel side flaps. The duct 2 also has a top plate 7 located therein, which together with the bottom plate 4 constitutes the mounting of the axis of rotation of the directional rudders 5, the swivel side flaps 3, and the horizontal rudders 8.

Figure 3:
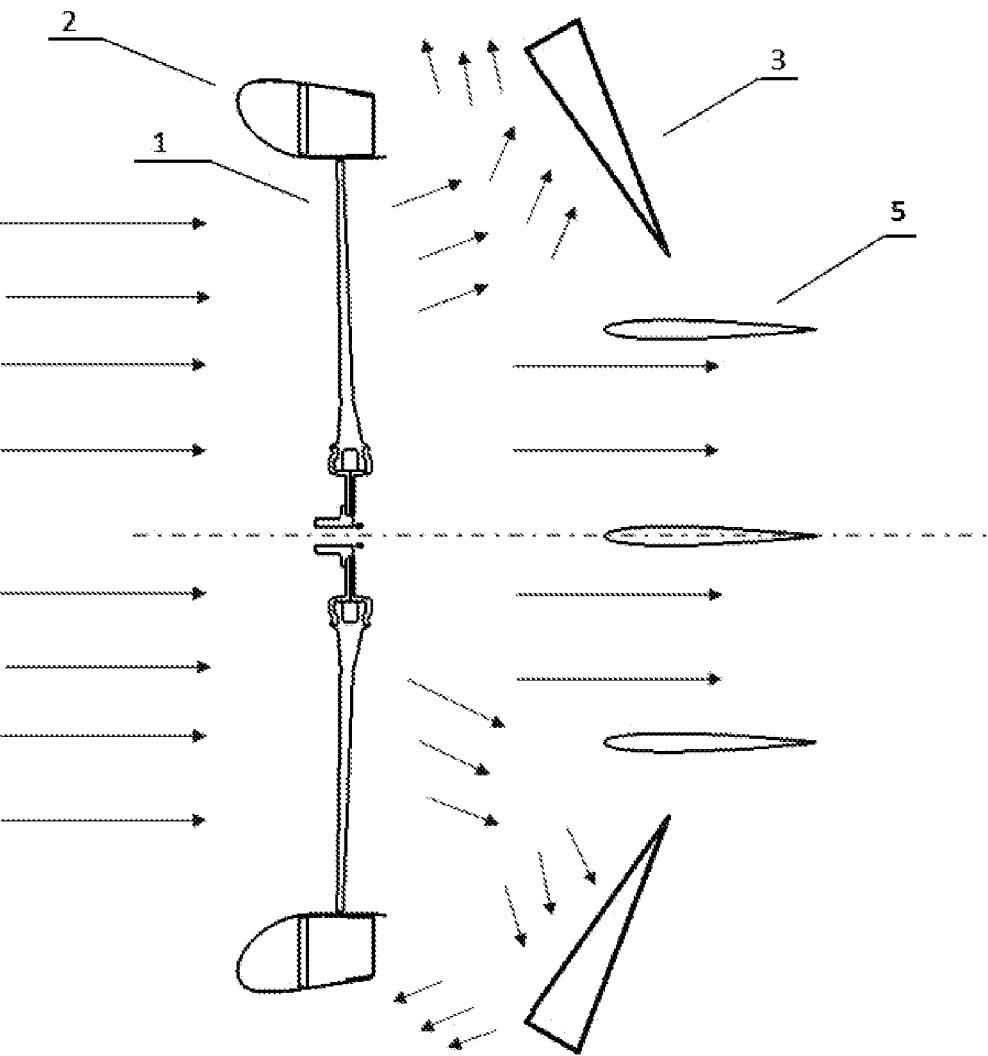

The swivel side flaps 3 have two positions—a resting position and an operating position. In the resting position, the swivel side flaps 3 form the outline of the duct 2 of the propulsion fan 1. By increasing the engine power, the pilot increases the speed of the propulsion fan 1, which increases both the thrust value and the amount of air discharged into the air-cushion 6. For flight conditions requiring a decrease in thrust value without changing the amount of air discharged into the air-cushion 6, the pilot, by pressing the appropriate buttons, moves the swivel side flaps 3 into the operating position, as illustrated in FIG. 3. In the operating position, the swivel side flaps 3 rotate relative to their own axis with the leading edge outwards of the airflow (i.e., symmetrically relative to a longitudinal axis of the hovercraft), the direction of which is illustrated by arrows, that redirects part of the propulsion flow in a forward direction that reduces the resultant of the thrust of the propulsion fan 1. The remaining part of the airflow is directed to the three directional rudders 5, providing independent directional control of the hovercraft by varying respective angles. The angles of the direction rudders may be equal or different.

The solution according to an embodiment, comprising three directional rudders, increases directional control by 50% during forward flight compared to the solution described in application description No. P.430204 comprising two directional rudders. The ability to pivot the swivel side flaps without closing the directional rudders makes it possible advantageously to reduce the thrust of the propulsion fan, thus controlling progressive movement of the hovercraft, while ensuring full directional control. This is particularly important when flying on ice with the wind so as to maintain the air-cushion and full directional control and, in parallel, eliminate acceleration of the hovercraft to dangerous speeds.

What is claimed is:

1. A control system of a hovercraft including one motor and a propulsion fan enclosed by a duct in which swivel side flaps are located, the control system comprising:
   at least three directional rudders located downstream of the duct, wherein each of the at least three directional rudders is operating in a full range of angular positions independently of a position of the swivel side flaps;
   a bottom plate in the duct downstream the propulsion fan and parallel to ground, the bottom plate forming a pocket redirecting a part of airflow passing the hovercraft into an apron of an air-cushion; and
   a top plate in the duct downstream the propulsion fan and parallel to the ground, wherein the bottom plate and the top plate are mountings for a rotational axis of the at least three directional rudders, the swivel side flaps, and horizontal rudders.

2. The control system according to claim 1, wherein the swivel side flaps rotate symmetrically relative to a longitudinal axis of the hovercraft.

3. A control method of the hovercraft using the control system according to claim 1, the control method comprising:
   controlling a thrust generating progressive movement of the hovercraft by varying an angle of the swivel side flaps; and
   independently controlling a direction of flight of the hovercraft by varying respective angles of at least three directional rudders, wherein the at least three directional rudders operate over a full range of angular positions independently of a position of the swivel side flaps.

4. The control method according to claim 3, wherein the swivel side flaps rotate symmetrically relative to a longitudinal axis of the hovercraft.

5. The control method according to claim 4, wherein the respective angles of the at least three directional rudders are equal.

6. The control method according to claim 3, wherein the respective angles of the at least three directional rudders are equal.

* * * * *